March 14, 1944.  G. A. WAHLMARK  2,344,335
HYDRAULIC TRANSMISSION
Filed Sept. 12, 1939  5 Sheets-Sheet 1
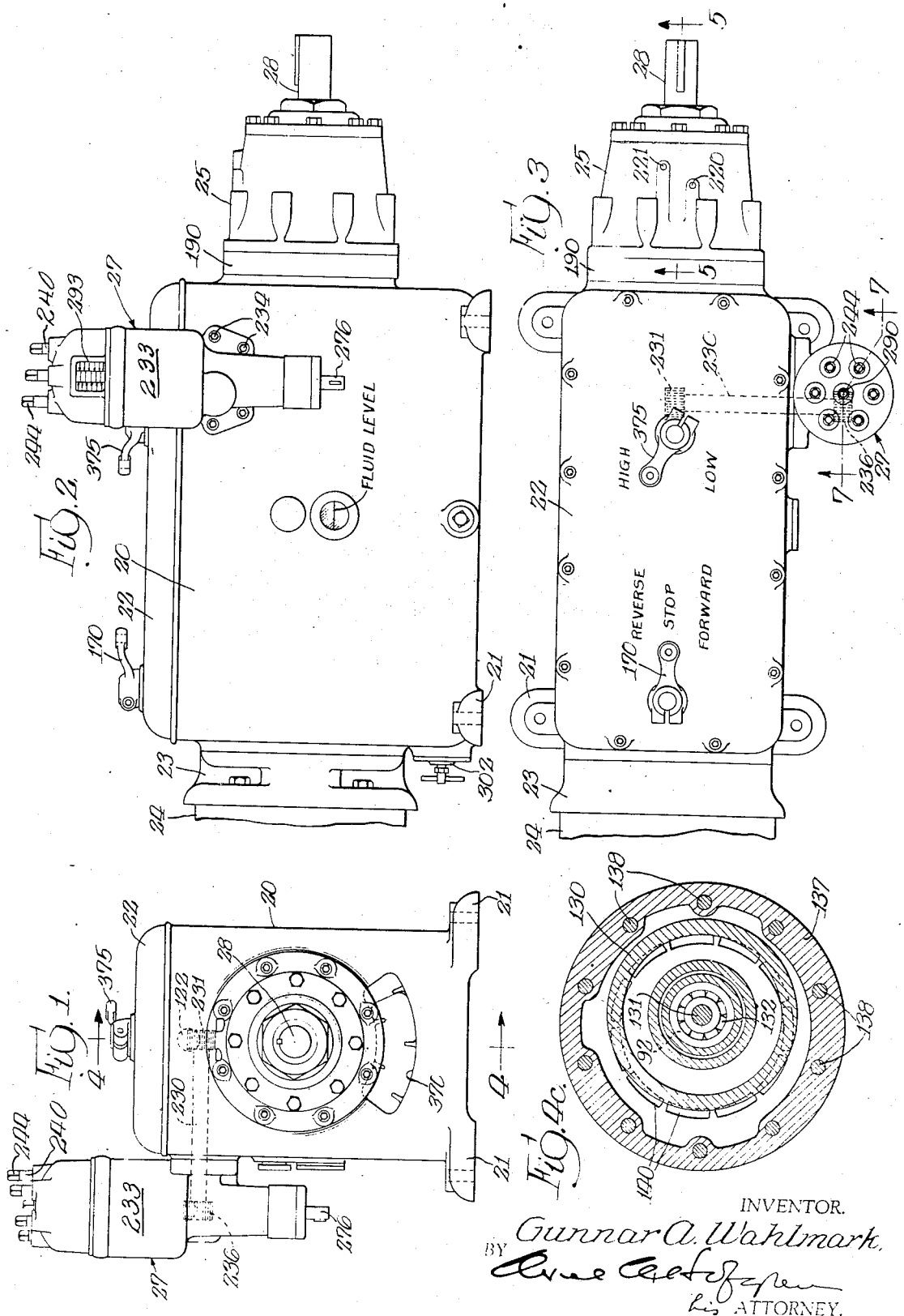
INVENTOR.
Gunnar A. Wahlmark
BY
his ATTORNEY.

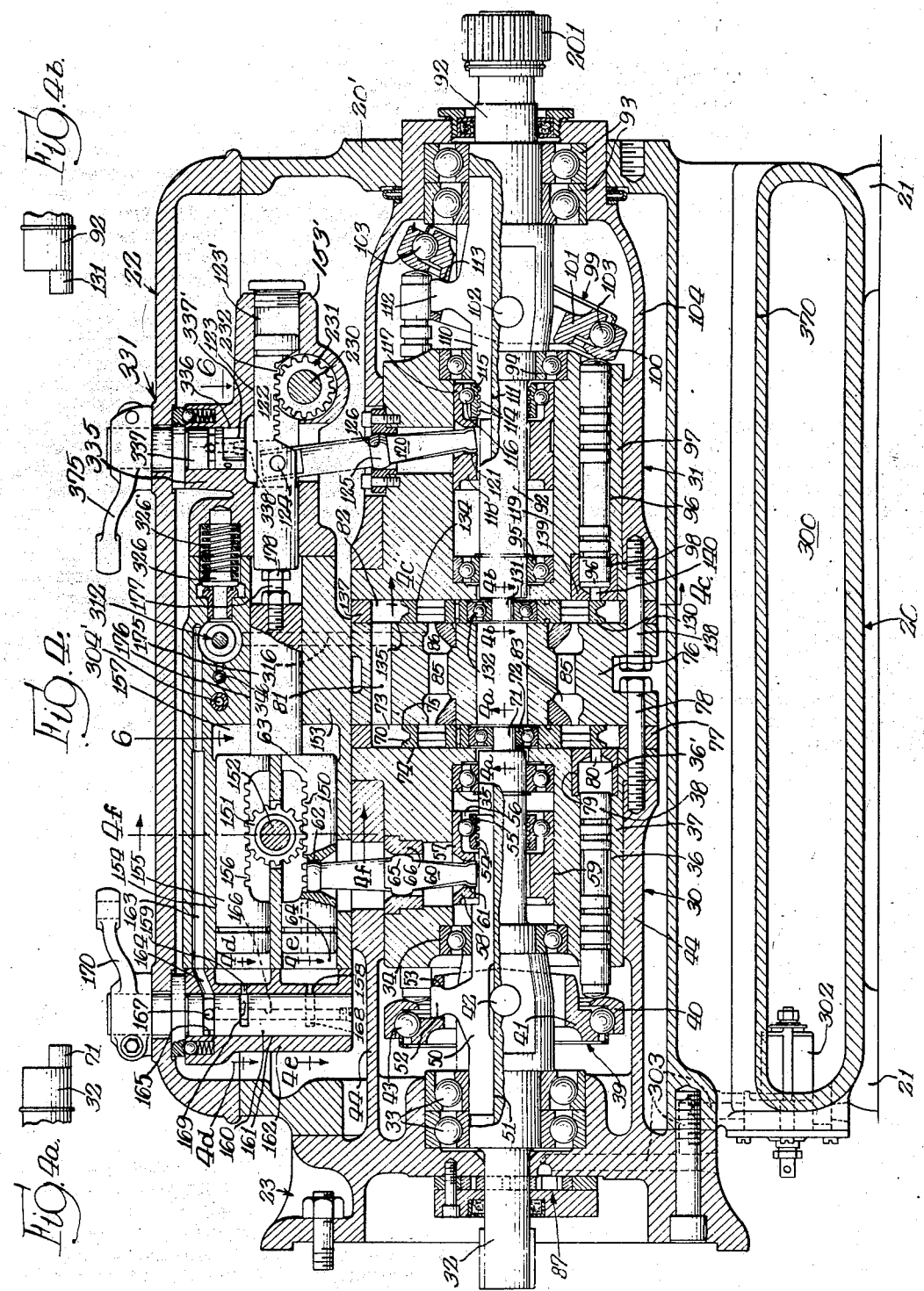

March 14, 1944.　　　G. A. WAHLMARK　　　2,344,335
HYDRAULIC TRANSMISSION
Filed Sept. 12, 1939　　　5 Sheets-Sheet 3
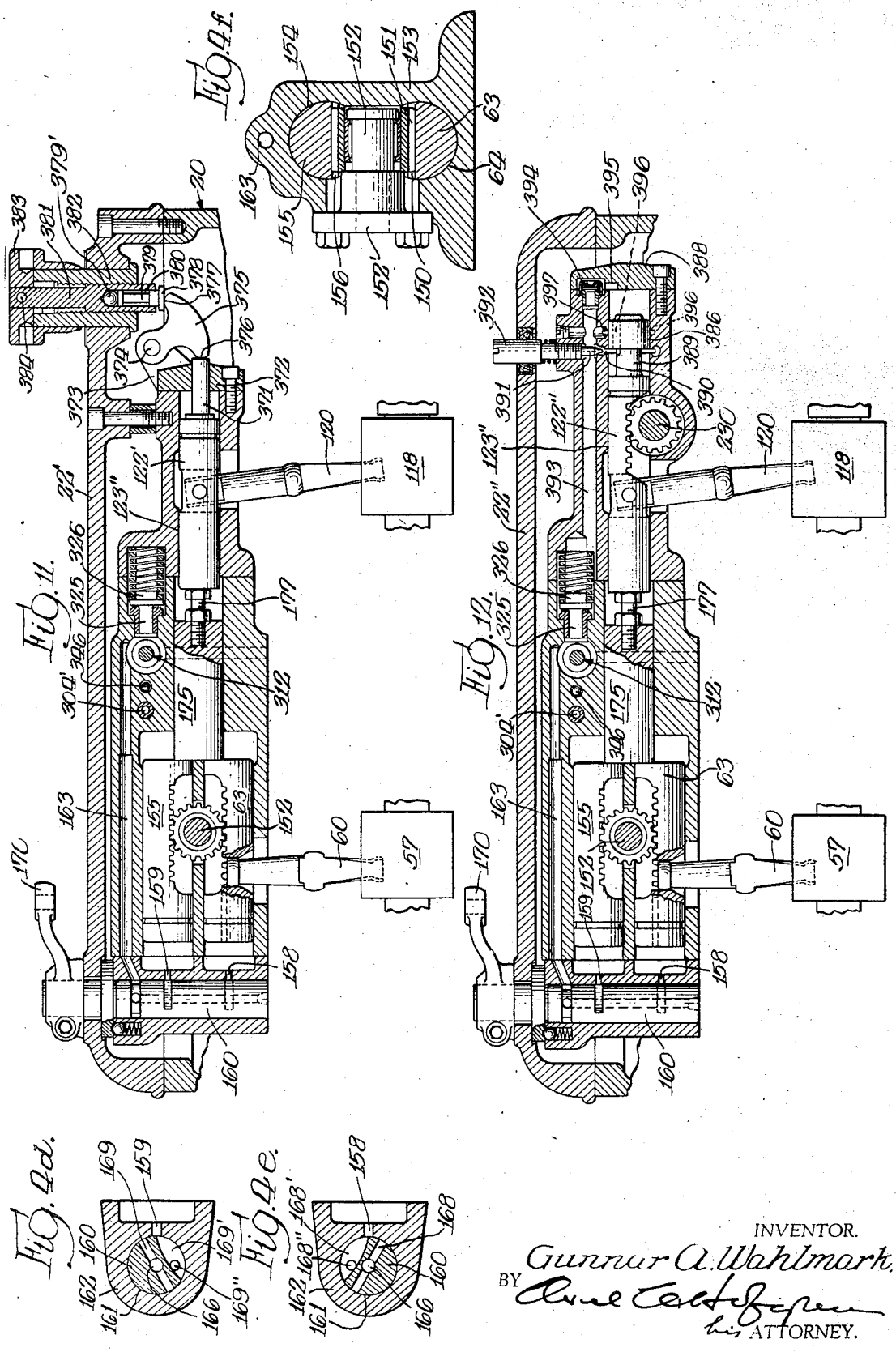
INVENTOR.
Gunnar A. Wahlmark,
BY
his ATTORNEY.

March 14, 1944.  G. A. WAHLMARK  2,344,335
HYDRAULIC TRANSMISSION
Filed Sept. 12, 1939  5 Sheets-Sheet 4
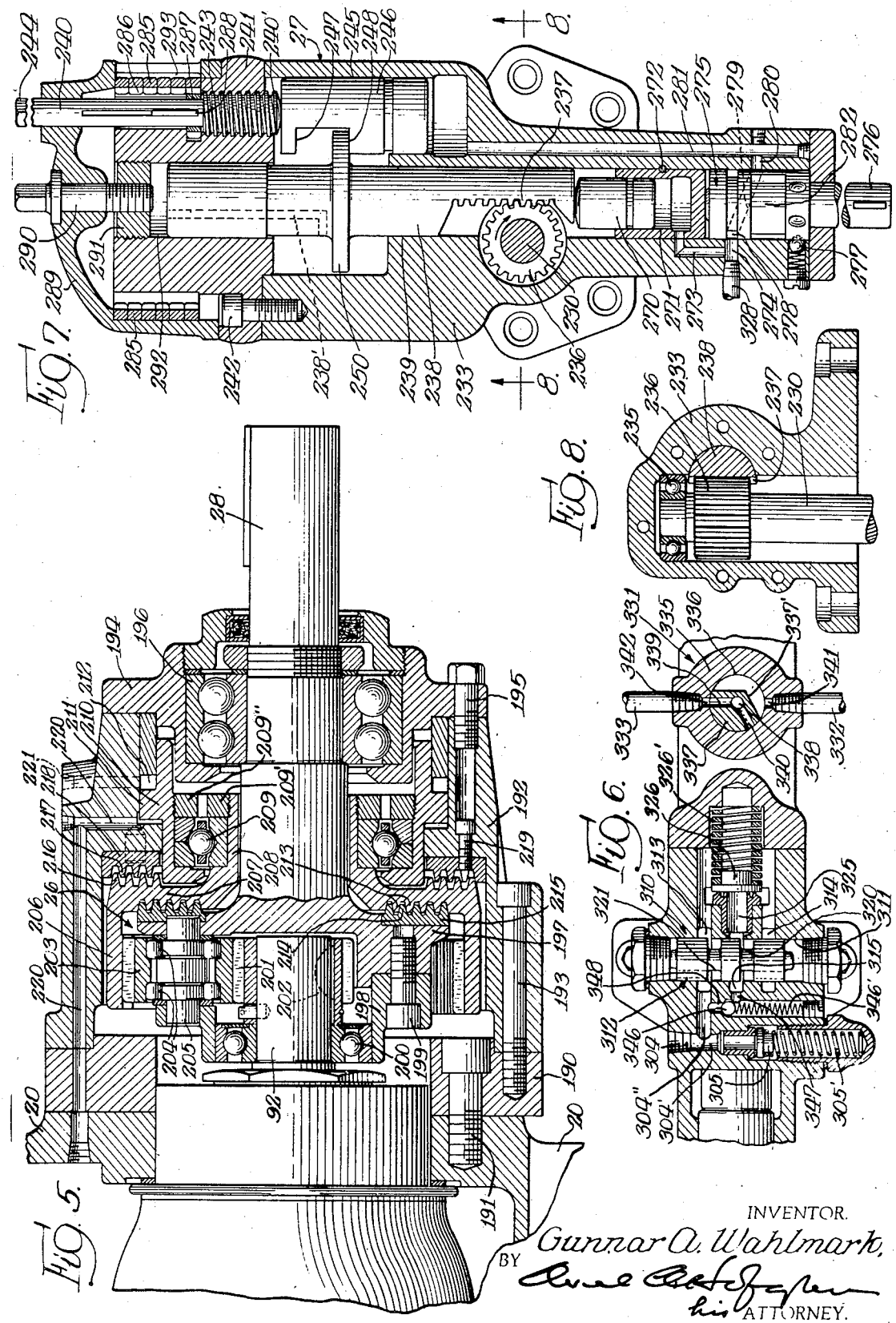
INVENTOR.
Gunnar A. Wahlmark,
BY
his ATTORNEY.

March 14, 1944.  G. A. WAHLMARK  2,344,335
HYDRAULIC TRANSMISSION
Filed Sept. 12, 1939   5 Sheets-Sheet 5
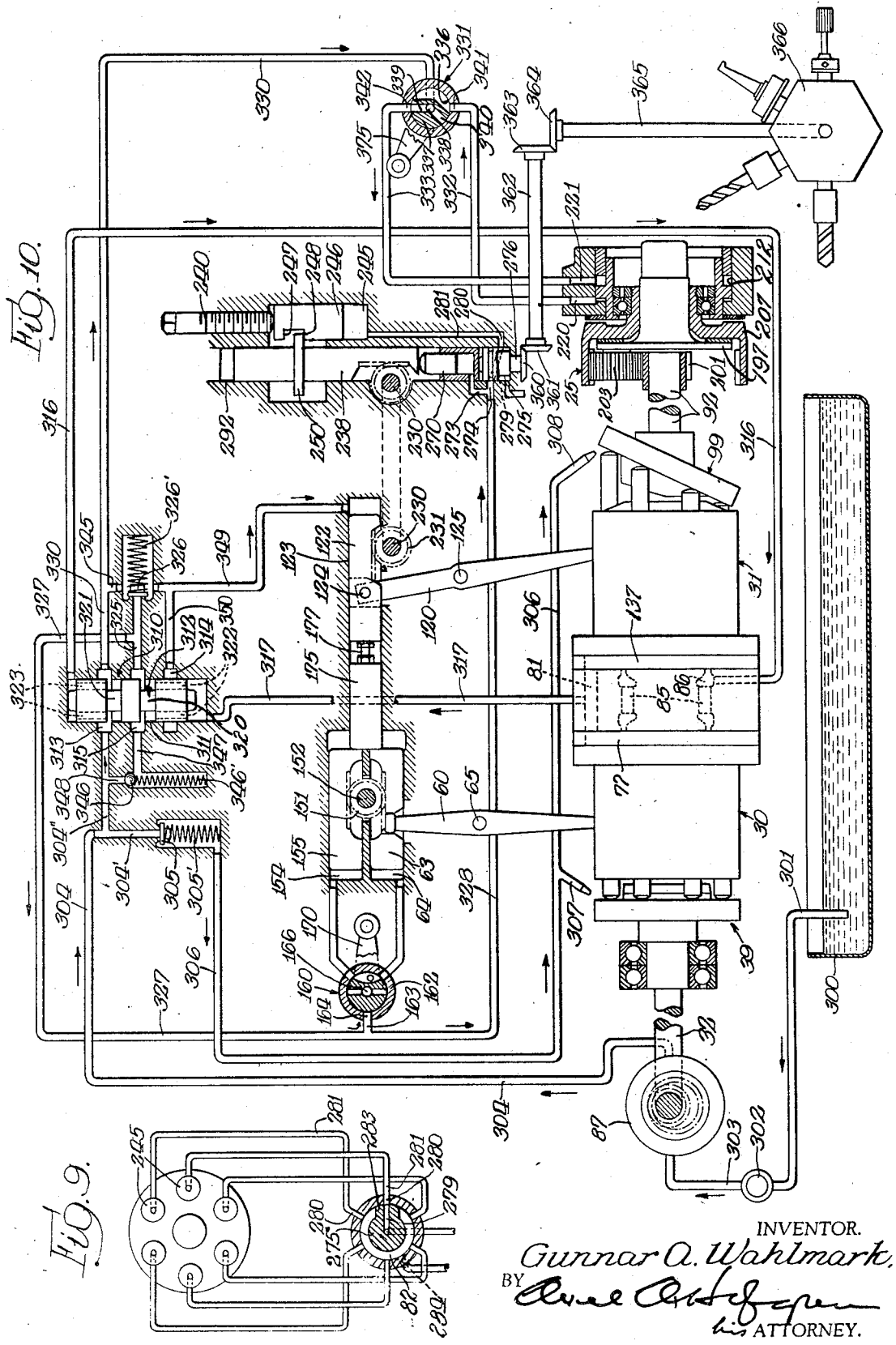
INVENTOR.
Gunnar A. Wahlmark,
BY
his ATTORNEY.

Patented Mar. 14, 1944

2,344,335

UNITED STATES PATENT OFFICE 2,344,335

HYDRAULIC TRANSMISSION

Gunnar A. Wahlmark, Rockford, Ill.

Application September 12, 1939, Serial No. 294,470

18 Claims. (Cl. 60—53)

More particularly, the invention relates to transmissions having a constant speed input shaft and an adjustable speed output shaft, it being the general object of the invention to provide a new and important transmission of this type.

Another object is to provide a hydraulic or fluid transmission embodying a variable displacement fluid pump and a variable displacement fluid motor, together with means for controlling the displacement of the pump and the displacement of the motor to obtain any one of a plurality of predetermined output or driven shaft speeds.

In adapting fluid transmissions for use in actuating movable supports in machine tools, as well as for other applications, it is frequently desirable to have available a relatively large number of driven shaft speeds which may be obtained automatically or at the will of the operator by actuation of one or more control elements, the various speeds, however, being preselected or preadjusted. In a fluid transmission embodying a pump and a motor, the changes in speed may be obtained by changing the strokes of the pistons of one or both such devices. The present invention has for an object the provision of a new and improved control mechanism for adjusting the stroke of a fluid pump or motor to preselected lengths.

Another object is to provide a control for such a fluid transmission embodying a plurality of independently adjustable stop elements and mechanism connected to the wobble plates of the pump and motor having means engageable selectively with said adjustable stop elements.

Another object is to provide a new and improved control mechanism for fluid motors embodying a control element movable to adjust the motor speed and a plurality of independently adjustable and independently operable stop members for determining the position of the control element.

It is another object of the invention to provide a new and improved fluid transmission embodying a fluid pump, a fluid motor, and speed reduction gearing, together with fluid operated devices for selecting the speed at which the output shaft of the transmission is driven.

It is a further object of the invention to provide a new and improved fluid transmission embodying a reversible output fluid pump, a fluid motor arranged to receive the output of the pump and be driven thereby, a make-up pump, and a hydraulic circuit connecting said devices and including a reversing valve operable automatically to direct make-up fluid to the return passage from the motor to the pump.

Other objects will become readily apparent from the following detailed description taken in connection with the accompanying drawings, wherein:

Fig. 1 is an end elevational view of a preferred form of the invention looking at the right hand end of Fig. 2.

Fig. 2 is a front elevational view thereof looking from the left in Fig. 1.

Fig. 3 is top plan view.

Fig. 4 is a longitudinal central section approximately along the line 4—4 of Fig. 1.

Fig. 4a is a fragmentary view along the line 4a—4a of Fig. 4.

Fig. 4b is a fragmentary view along the line 4b—4b of Fig. 4.

Figs. 4c, 4d, 4e and 4f are fragmentary sections approximately along line 4c—4c, 4d—4d, 4e—4e and 4f—4f, respectively, of Fig. 4.

Fig. 5 is an enlarged fragmentary vertical section approximately along the line 5—5 of Fig. 3.

Fig. 6 is a fragmentary plan sectional view along the line 6—6 of Fig. 4.

Fig. 7 is a vertical section approximately along the line 7—7 of Fig. 3.

Fig. 8 is a section along the line 8—8 of Fig. 7.

Fig. 9 is a circuit diagram of a portion of the control mechanism, showing a valve in transverse section.

Fig. 10 is a circuit diagram.

Fig. 11 is a fragmentary vertical section in the same plane as Fig. 4 but illustrating a modified form of the invention.

Fig. 12 is a similar fragmentary view illustrating still another form of the invention.

While there is illustrated in the drawings and hereinafter described in detail a preferred form of the invention, together with two modifications thereof, it is to be understood that the invention is not limited to the particular forms and arrangements shown, it being contemplated that various changes may be made by those skilled in the art without departing from the spirit and scope of the appended claims.

As illustrated in the drawings and with particular reference to Figs. 1 to 10, the invention comprises a somewhat rectangular casing 20 provided with feet or attaching lugs 21 at the bottom thereof, and a detachable cover 22 on the top thereof. To the left hand end of the casing 20 as viewed in Figs. 2 and 3, is secured an adapter 23 by which is mounted a suitable electric driving motor 24. At the other end of the casing is supported a housing 25 of a speed change mechanism 26 (Fig. 5). Secured in an upright position on the front wall of the casing 20 is a control mechanism designated generally 27, a detailed description of which will appear hereinafter. 28 indicates a driven or output shaft of the transmission. It is this shaft that may be driven at any one of a large number of preselected speeds.

Within the casing 20 (Fig. 4) is located a multiple piston variable displacement pump 30 and a multiple piston variable displacement motor 31. The pump has a shaft 32 rotatably mounted in bearings 33, 34 and 35. It will be assumed, for purposes of this description, that the motor 24 drives the shaft in a clockwise direction, as viewed from the left in Figs. 2 to 4. A plurality of cylinders 36 are arranged annularly about the shaft 32 in a cylinder block 37 and have pistons 38 therein which are operable by means of a wobble plate device 39. The wobble plate device has an outer annular member 40 engaging the adjacent spherically surfaced ends of the pistons, and an inner annular member 41 pivotally mounted on the shaft 32 by means of a diametrically extending pin 42, a plurality of balls 43 being positioned between races formed on the members 40 and 41 to form a rotary connection therebetween. The cylinder block 37 is supported in an inwardly extending tubular portion 44 of the adapter 23.

The means for adjusting the wobble plate device 39 includes a member 50 slidable longitudinally in a slot 51 in the shaft 32, the member 50 having an outwardly extending arm 52 which engages in a recess 53 in the annular member 41. At its right hand end, the member 50 has a plurality of outwardly extending teeth 54 which are interengaged with corresponding grooves in an inner ball race 55 of a bearing 56. The outer race 57 of this bearing is formed integrally with an annular member 58 slidably mounted in a bore 59 in the cylinder block 37. A control lever 60 has its lower end positioned in a socket 61 in the member 58 and its upper end positioned in a socket 62 in a piston 63 slidably mounted in a cylinder 64 (Figs. 4 and 4f). Cylinder 64 is formed in a block or housing member 153 which is suitably bolted to the top of the adapter portion 44. An intermediate spherically surfaced portion 65 of the lever 60 is fulcrumed in a bushing 66 secured in the cylinder block 37. Thus, movement of the piston 63 in its cylinder 64 serves to swing the lever 60 and thereby effect longitudinal movement of the member 50 to increase or decrease the displacement of the pump 30, or to reverse the direction of the flow of fluid therethrough.

The flow of fluid to and from the head ends 36' of the cylinders 36 is controlled by means including a wheel-like valve member 70 which is mounted on an eccentric pin portion 71 (Figs. 4 and 4a) of the shaft 32 by means of a ball bearing 72. This particular valve mechanism is disclosed and claimed in my copending application Serial No. 143,069, filed May 17, 1937, now Patent No. 2,190,812, dated February 20, 1940. Briefly, the valve member 70 is positioned in a cylindrical valve chamber 73 formed between an end face 74 of the cylinder block 37, an adjacent end face 75 of a housing member 76, and a ring 77 secured between said end faces. As illustrated in Fig. 4, the parts 44, 37, 77 and 76 are secured together by means of a plurality of bolts 78. The head ends 36' of the cylinders are formed by means of cup-shaped inserts 79 provided each with a cylinder port 80 shaped like the ports 140 shown in Fig. 4c. During the operation of the pump and the valve 70, the cylinder ports 80 are connected alternately with the outer portion of the chamber 73 and the inner portion thereof. The outer portion of the chamber communicates with an outlet passage 81 which extends through the housing member 76 and into communication with the outer portion of a similar cylindrical valve chamber 82 for the motor 31. The inner portion of the chamber 73 is connected to the inner portion of the motor valve chamber 82 by ports 83, 85 and 86. Make-up fluid is supplied to the circuit, in a manner hereinafter more fully described, from an auxiliary gear type pump 87 (Figs. 4 and 10).

The motor 31 is similar in construction to the pump 30 and has a shaft 92 rotatably mounted in bearings 93, 94 and 95. Rotation of shaft 92 in a clockwise direction, as viewed in Fig. 1, will hereinafter be considered as forward operation of the motor 31. A plurality of cylinders 96 are arranged annularly about the shaft 92 in a cylinder block 97 and have pistons 98 therein which are operable by means of a wobble plate device 99. The wobble plate device has an outer annular member 100 engaging the adjacent spherically surfaced ends of the pistons, and an inner annular member 101 pivotally mounted on the shaft 92 by means of a diametrically extending pin 102, a plurality of balls 103 being positioned between races formed on the members 100 and 101 to form a rotary connection therebetween. The cylinder block 97 is supported in part by a tubular member 104 supported at its right hand end (Fig. 4) in a bore in an end wall 20' of the casing 20.

The means for adjusting the wobble plate device 99 includes a member 110 slidable longitudinally in a slot 111 in the shaft 92, the member 110 having an outwardly extending arm 112 which engages in a recess 113 in the annular member 101. At its left hand end (Fig. 4), the member 110 has a plurality of outwardly extending teeth 114 which are interengaged with corresponding grooves in an inner ball race 115 of a bearing 116. The outer race 117 of this bearing is formed integrally with an annular member 118 slidably mounted in a bore 119 in the cylinder block 97. A control lever 120 has its lower end positioned in a socket 121 in the member 118 and its upper end positioned in an opening in a piston 122 slidably mounted in a cylinder 123, the lever being pivotally connected to the piston 122 by a pin 124. The cylinder 123 is formed in a housing member 153' suitably secured to the right hand end of the housing member 153. An intermediate spherically surfaced portion 125 of the lever 120 is fulcrumed in a bushing 126 secured to the cylinder block 97. Thus, movement of the piston 122 in its cylinder 123 serves to swing the lever 120 and thereby effect longitudinal movement of the member 110 to increase or decrease the displacement of the motor 31.

The flow of fluid to and from the head ends 96' of the cylinders 96 is controlled by means including a wheel-like valve member 130 which is mounted on an eccentric pin portion 131 (Figs. 4 and 4b) of the shaft 92 by means of a ball bearing 132. The valve member 130 is positioned in the cylindrical valve chamber 82 which is formed between an end face 134 of the cylinder block 97, an adjacent end face 135 of the housing member 76 and a ring 137 secured between said end faces. As illustrated in Fig. 4, the parts 104, 97, 137 and 76 are secured together by means of a plurality of bolts 138. The head ends 96' of the cylinders are formed by means of cup-shaped inserts 139 provided each with a cylinder port 140 (Figs. 4 and 4c). During the operation of the motor and its valves 130, the cylinder ports 140 are connected alternately with the outer or inlet portion of the chamber 82 and the inner or outlet portion thereof.

In the form illustrated in Figs. 1 to 10, the speed of the motor shaft 92 is adjusted by changing the angular positions of the wobble plates 39 and 99 of the pump and motor, respectively. The changes in angular positions of these wobble plates are accomplished simultaneously by mechanism, a portion of which has hereinbefore been described and the remainder of which will now be described. Referring particularly to Figs. 4 and 4f, the piston 63 to which the upper end of the pump adjusting lever 60 is connected has rack teeth 150 which mesh with a pinion 151 rotatably mounted on a shaft 152 which is supported in a flanged bushing 152' bolted to the housing member 153. The cylinder 64 for the piston 63 is formed in this housing member as is also an adjacent and parallel cylinder 154 in which a piston 155 reciprocates. Piston 155 has rack teeth 156 also meshing with the pinion 151 so that as the piston 63 moves in one direction the piston 155 moves in the opposite direction. The right hand ends of the cylinders 64 and 154 (Fig. 4) are interconnected by means of a recess 157. The left hand end of the cylinders are formed in a valve casing 162 suitably secured to the left hand end of the housing member 153. Cylinder 64 is provided with a port 158 in the casing 162, and cylinder 154 is provided with a similar port 159. Fluid may be supplied to either of said cylinders by means of a cylindrical valve member 160 (Figs. 4, 4d, 4e and 10) positioned in a vertical bore 161 in the valve casing 162 secured to the left hand end of the housing 153. This valve member has three positions, a "forward" position, a "stop" position (as indicated in Fig. 3), and a "reverse" position. A port 163 in the housing member 153 (which receives fluid under pressure in a manner hereinafter described) communicates with a port 164 in the valve casing 162. This port in turn communicates with an annular recess 165 in the valve member 160. An axially extending port 166 in the valve member receives fluid from the annular recess 165 through a diametrical port 167 and discharges it into angularly displaced, diametrically extending ports 168 and 169 (Figs. 4, 4d and 4e). The valve member has an operating arm 170 secured to the upper end thereof (Figs. 1 to 4). When this operating arm is in the "stop" position, as shown in Figs. 2 to 4, the ports 168 and 169 are both out of communication with the cylinder ports 158 and 159, respectively, as shown in Figs. 4d and 4e. When the handle 170 is moved to the "forward" position, fluid is supplied from the radial port 169 of the valve member through the cylinder port 159 to the cylinder 154 whereupon the piston 155 is moved toward the right (Fig. 4). This causes the piston 63, through the intervening rack and pinion connections, to move toward the left, thereby swinging the wobble plate 39 in a clockwise direction about the pivot pin 42. If the operating handle 170 is moved to the "reverse" position, the radial port 168 of the valve member supplies fluid to the cylinder port 158 to move the piston 63 toward the right, thus pivoting the wobble plate 39 in a contour clockwise direction on the pivot pin 42. The valve member 162 is also provided with side wall slots 168' and 169' which connect respectively with longitudinal exhaust ports 168'' and 169'' to relieve the pressure in the ends of the cylinders 64 and 154 when not connected to the fluid supply. Ports 168'' and 169'' discharge at the lower end of the valve member and into the casing 20.

In order to adjust the wobble plate 99 of the motor simultaneously with the wobble plate 39 of the pump, movement is imparted to the piston 122 by means of a cylindrical member 175 (Figs. 4 and 10) slidably mounted in a bore 176 in the housing 153, which bore is aligned with the cylinder 123. The member 175 at its left hand end projects into the recess 157 so as to be engageable by one or both of the pistons 63, 155. At its right hand end, the member 175 carries an adjustable screw device 177, the head 178 of which is adapted to abut the adjacent end of the piston 122. Thus, movement of either of the pistons 63, 155 toward the right from the zero stroke position shown in Figs. 4 and 10, will cause movement of the cylindrical member 175 and the piston 122 toward the right, thus causing a counterclockwise movement of the wobble plate 99 on its pin 102 from the maximum stroke position shown to a shorter stroke position, which shorter stroke position is determined by a control mechanism hereinafter more fully described. It will be evident that the wobble plate device 99 will be moved in a counterclockwise direction from its full stroke position regardless of whether piston 63 functions to operate the wobble plate 39 or whether the piston 155 functions to operate the wobble plate 39. Thus, the stroke of the motor is adjusted from maximum toward minimum for both forward and reverse rotation of the motor shaft. The wobble plates are normally held in the positions illustrated in Fig. 4 by fluid under pressure which is constantly admitted to the right hand end 123' of the cylinder 123.

In the form illustrated in Figs. 1 to 10, the invention is shown as embodying a speed change mechanism 26 (Fig. 5) in which the drive shaft is the shaft 92 of the motor 31 and the driven shaft is the output shaft 28 of the transmission. The speed change mechanism comprises an annular adapter 190 (Figs. 2, 3 and 5) secured to the casing 20 by means of a plurality of bolts 191, an annular housing member 192 secured to the adapter 190 by means of a plurality of bolts 193 and a cover member 194 secured to the housing 192 by means of a plurality of bolts 195. The output shaft 28 is rotatably mounted on the cover member 194 by means of a ball bearing 196, and at its inner end has a radially extending flange 197. A collar 198 is secured to said flange by means of a plurality of bolts 199, and to support the inner end of the shaft 28 a ball bearing 200 is positioned intermediate the collar 198 and the motor shaft 92.

In the form illustrated herein, the speed change mechanism 26 consists of planetary gearing. Thus, a sun gear or pinion 201 (Fig. 5) is secured to the motor shaft 92 by means of a key 202 and meshes with a plurality of planet gears 203 (preferably three in number) which are rotatably mounted on a planet carrier formed by the flange 197 of the shaft 28 and the collar 198, by means of roller bearings 204 and shafts 205. A ring gear 206 meshes with the planet gears 203. A clutch plate 207 is formed integrally with the ring gear and with a tubular member 208 which surrounds a portion of the shaft 28. The ring gear is rotatably mounted on the housing 192 by means of a ball bearing 209 interposed between the tubular member 208 and a bushing 210, the inner and outer races of the bearing being clamped to the member 208 and the bushing 210, respectively, by means of screw-threaded nut devices 209' and 209''. The bushing 210 is slidable longitudinally of the housing and has a piston portion 211 reciprocable in a cylinder 212 (in the housing) for the purpose of shifting the clutch plate 207 from one to the other of two engaged positions. When shifted toward the left (Fig. 5) a clutch surface on the clutch plate formed by a plurality of annular ribs 213 engages a clutch face on the planet carrier formed by corresponding annular ribs 214 on a clutch plate 215 which is secured to the radially extending flange 197 of the shaft 28. When the clutch plate is moved toward the right, a clutch surface formed by a plurality of annular ribs 216 on the plate 207 engages a corresponding clutch surface formed by annular ribs 217 on an annular stationary clutch member 218 bolted to the housing 192 by means of a plurality of screws 219. When the clutch plate 207 is shifted toward the left into engagement with the planet carrier, the gears become locked and the output shaft 28 rotates in unison with the motor shaft 92. When the clutch plate 207 is shifted toward the right so as to hold the ring gear stationary, the output shaft 28 is rotated at a reduced speed compared with the motor shaft 92.

The operation of the speed change mechanism just described is accomplished by the piston 211 operable in the cylinder 212 by supplying fluid under pressure to one end or the other of the cylinder. As illustrated in Fig. 5, a port 220 communicates with the left hand end of the cylinder 212 and a port 221 communicates with the right hand end of the cylinder. The supply and control of fluid to these ports will be described hereinafter in connection with the hydraulic circuit illustrated in Fig. 10.

The speed of the motor shaft 92 may be varied from zero (which occurs with the parts in the positions shown in Fig. 4 wherein the pump stroke is zero and the motor stroke is at maximum) to a maximum speed when the pump stroke is at a maximum and the motor stroke is at a minimum. Intermediate speeds of the motor shaft are obtained by means of a control mechanism now to be described.

The control mechanism 27 (Figs. 1 to 3 and 7 to 10) is operative to determine a plurality of preselected positions of the control piston 122 (Figs. 4 and 10) and includes a shaft 230 extending transversely of the casing 20 (see Figs. 1 and 3) and having a pinion 231 thereon meshing with rack teeth 232 formed on the piston 122. The shaft 230 projects outwardly from the casing 20 and into a hollow somewhat cylindrical housing 233 (Figs. 7 and 8) which is secured in position to one side of the casing 20 by means or a plurality of bolts 234. At its outer end the shaft 230 is supported in said housing by means of a ball bearing 235. Secured to the shaft 230 is a pinion 236 (Figs. 1, 3, 7 and 8) which meshes with rack teeth 237 formed on a cylindrical plunger 238 which is slidable vertically in a bore 239 positioned centrally of the housing 233. The cylindrical plunger 238 is, functionally, a control element which is movable to any one of a plurality of predetermined positions for the purpose of changing the speed of the motor shaft 92.

The gearing just described including shaft 230, pinion 231, rack teeth 232, pinion 236, and rack teeth 237 form a connecting means between the control element 238 and the control piston 122 so that the control piston 122 will be shifted to different positions corresponding to or having a fixed relation with the different positions of the control element 238.

The means for preselecting different positions of the control element 238 includes a plurality of screw devices 240, herein six in number. These screw devices are threaded through an annular member 241 which is secured to the upper end of the cylindrical housing 233 by means of a plurality of screw devices 242. The screw devices 240 are threaded at their lower ends 240' and engage in threaded bores 243 in the member 241. The upper ends of the screw devices 240 are squared as at 244 to receive a suitable tool for adjusting purposes. Aligned with each screw 240 is a cylinder 245 in the housing 233. A piston 246 is positioned in each cylinder 245. The pistons 246 have side wall recesses leaving shoulders 247 and 248 at the upper and lower ends thereof (Fig. 7). An annular flange 250 formed integrally with the control element 238 projects into the recesses in the pistons and is movable vertically therein.

The pistons 246 are effective, when in their upper positions abutting the corresponding screws 240, to preselect a speed of the motor shaft 92. When in such a position, as illustrated in Fig. 7, the flange 250 of the control element 238 engages the abutment 248 on the piston 246 to determine the position necessary to obtain the preselected motor speed. Preferably, the control element 238 is urged upwardly continuously by fluid under pressure operable on a piston 270 which is reciprocable in a cylinder 271 positioned below the control element 238 in the bore 239. This cylinder is in the form of a cup-shaped bushing secured in position by means of a pin 272. Fluid is supplied to the lower end of the cylinder 271 by means including a port 273 and a connecting supply port 274.

The pressure supplied to the reversing pistons 63, 155 (Fig. 4) may be approximately 1,000 pounds per square inch. The force exerted by the reversing pistons is effective to rotate the shaft 231 in a clockwise direction, as viewed in Figs. 4, 7 and 10, and, therefore, is effective to move the control element 238 downwardly until the annular flange 250 therein engages the abutment surface 248 on that piston 246 which is then effective to determine the speed of the output shaft. Fluid from the same supply source of approximately 1,000 pounds per square inch is fed to the port 274 and, therefore, is applied to the piston 270 as well as to the preselected piston 246 to hold the latter upwardly in engagement with the corresponding screw 240. The piston 270, which is of somewhat smaller diameter than the reversing pistons 63, 155, is provided to reduce the effect of the reversing pistons in causing downward movement of the control element 238, thereby insuring the effectiveness of the piston 246. Each of the pistons 246 is of such cross sectional area that with the aid of the piston 270 it is able to overcome any tendency of the reversing pistons 63 and 155 to shift the control element 238 downwardly as viewed in Fig. 10.

The selection of the different motor speeds is herein accomplished by means of a cylindrical valve 275 (Figs. 7 and 10) mounted in the lower end of the bore 239. This valve is provided with a stem 276 projecting downwardly from the housing 233 and has six operative positions, one for each of the speed selecting pistons 246. A detent device 277 is preferably provided for releasably holding the valve in its different positions. The valve 275 has an annular groove 278 positioned to receive fluid from the supply port 274 and also has a diagonally extending port 279 which communicates at one end with the groove 278 and at its other end with the outer surface of the valve, as shown most clearly in Fig. 7. When in the position illustrated, the port 279 communicates with a short horizontal port 280 which in turn communicates with a vertical port 281 discharging at its upper end into the lower end of a cylinder 245. As illustrated diagrammatically in Fig. 9, there is a set of ports 280, 281 for each cylinder 245. Thus, by rotating the valve 275, the port 279 may be selectively connected with any one of the plurality of ports 280 with the result that fluid is supplied to the corresponding cylinder 245 to move the piston 246 therein upwardly into engagement with the lower end of the corresponding screw 240. To permit discharge of fluid from the cylinders 245 when not connected to the diagonal port 279, the valve 275, outwardly of port 279, is formed with a groove 282 (Figs. 7, 9 and 10) interrupted by a segmental portion 283 (Fig. 9) through which port 279 opens. This groove is at all times open to all but one of the ports 280 and is also in constant communication with a port 284 in the casing 233 leading to the tank.

Means is preferably provided for indicating the speeds for which the screws 240 have been adjusted. As illustrated herein (Figs. 2 and 7), this means includes a plurality of indicating rings 285, one for each of the screws 240. These rings have internal gear teeth 286 thereon. Each screw 240 is provided with a pinion 287 secured thereto by a key 288, the pinion of each screw 240 meshing with a different ring 285. The upper end of the control mechanism is enclosed by means of a cap 289 secured to the member 241 by means of a screw device 290 which extends through the cap 289 and into engagement with a plug 291 threaded into the upper end of a bore 292 in the member 241. As shown in Fig. 7, the control element 238 has its upper end projecting into the bore 292 for guide purposes and a relief port 238' is provided in the element 238 to drain leakage fluid from the bore 292. The cap 289 has a somewhat rectangular opening 293 in one side thereof through which the adjacent portions of the indicating rings 285 are visible. These rings may be provided with suitable indicia. For example, with a speed change mechanism 26 (Fig. 5) having a 4:1 ratio, the rings may be marked in steps from 2400/600 to 100/25 R. P. M. for the output shaft 28, the higher range of speeds (2400/100 R. P. M.) being obtained when the speed change mechanism is in direct drive and the lower range speeds (600/25 R. P. M.) when the speed change mechanism provides a 4:1 speed reduction.

The fluid circuits for the transmission, together with certain portions of the control, are illustrated most clearly in Fig. 10. A fluid supply is contained in a reservoir 300, which reservoir in Fig. 4 is shown in the lower portion of the casing 20. Fluid from the reservoir 300 is drawn through a conduit 301, a strainer 302 and a conduit 303 to the gear type pump 87, whence it is discharged into a conduit 304 (Figs. 6 and 10) at a pressure of approximately 150 pounds per square inch. Fluid supplied to the conduit 304 passes to connecting ports 304' and 304". Excess fluid is by-passed through an adjustable relief valve 305 (which is backed by a coiled spring 305') to a conduit 306 which has nozzle connections 307 and 308 arranged to direct the by-passed fluid on to the wobble plate devices 39 and 99 of the pump 30 and motor 31, respectively. Since the fluid used is preferably a good quality of lubricating oil, the by-passed oil is thereby used for lubricating parts of the mechanism. The conduit 304" communicates with the casing of a reversing valve designated generally 310. The casing of this valve has a cylindrical bore 311 in which a cylindrical valve member 312 is reciprocable. Conduit 304" connects with an annular groove 313 in the valve casing which is spaced from one end of the valve bore 311. A corresponding groove 314 is spaced from the opposite end of the valve bore. A third annular groove 315 is located substantially centrally of the valve bore. One end of the valve bore 311 is connected by means of a conduit 316 to one of the ports 86 in the housing member 76. The other end of the valve bore 311 is connected by means of a conduit 317 to the port 81 in the housing member 86. The conduits 316 and 317 are used alternatively, depending upon the direction of fluid flow through the pump 30, to supply make-up fluid to the pump and motor cylinders and the fluid passages therebetween. Since it is desirable to supply the make-up fluid to the return passage from the motor 31 to the pump 30, the reversing valve 310 is provided so that the flow of make-up fluid may be changed from conduit 316 to conduit 317 or vice versa when the wobble plate 39 of the pump is shifted through its zero stroke position. At the same time the valve 310 functions to control the flow of high pressure fluid from the pump-motor circuit to portions of the other circuits requiring high pressure fluid for control purposes.

The valve member 312 has spaced annular grooves 320 and 321 (Figs. 6 and 10). Longitudinally extending ports 322 in the valve member establish communication between the annular groove 320 and the lower end of the valve member (Fig. 10), and longitudinally extending ports 323 establish communication between the annular groove 321 and the upper end of the valve. These ports function to pass high pressure fluid to the groove 315 in the valve casing, the ports 322 functioning in this manner when the valve member is in its raised position as shown and the ports 323 functioning in this manner when the valve member is in its lowered position at the other end of the valve bore 311. A port 325 connects with the groove 315 and communicates at its other end with a high pressure relief valve 326 which is backed by a coiled spring 326' (Figs. 6 and 10). A conduit 327 connects with the conduit 325 for the purpose of supplying high pressure fluid to the passage 163 leading to the reversing valve 160 (Figs. 4 and 10). A conduit 328 connects with the conduit 327 to supply high pressure fluid to the ports 274 and 273 (Fig. 7) in the housing 233 of the control mechanism.

Low pressure fluid from the pump 87 is also utilized in the operation of the shiftable clutch plate in the speed change mechanism 25. As shown in Fig. 10, a conduit 330 connects with the annular groove 313 of the valve 310 and communicates with a valve 331 (Figs. 4, 6 and 10). This valve is operable in one position to direct fluid into a conduit 332 which communicates with the port 220 (Fig. 5), or through a conduit 333 (as shown in Figs. 6 and 10) which communicates with the port 221. The valve 331 is illustrated more clearly in Figs. 4 and 6 wherein it is shown as comprising a casing 335 having a vertical valve bore 336 therein. A cylindrical valve member 337 has a central vertical port 338 to which the conduit 330 is connected. Radial ports 339 and 340 in the valve member 337 extend outwardly at an angle to each other. When the valve is in the position shown in Fig. 6, the port 339 communicates with a casing port 342 to which the conduit 333 is connected. A diametrically opposite casing port 341 is adapted for connection to the conduit 332 so that when the valve member 337 is rotated in a counterclockwise direction (Fig. 6) to connect the port 340 to the port 341, the clutch plate of the speed change mechanism is shifted to its direct or high speed position. The valve member 337 is cut away at 337' to permit fluid to exhaust from the inactive end of the cylinder 212. As shown in Fig. 6, fluid returning through the port 341 passes downwardly in the bore 336 and into the casing 20 (Fig. 4).

The fluid circuits as shown also include a conduit 345 connecting the low side of the high pressure relief valve 326 to the conduit 330. A ball check valve 346, backed by a coiled spring 346', is connected between the annular groove 315 and the conduit 304'' by conduits 347 and 348 in a manner to prevent flow of the high pressure fluid back into the low pressure conduit 304'' although under certain circumstances, such as when starting up the transmission, it permits low pressure fluid from conduit 304'' to pass to the groove 315. Low pressure fluid is supplied continuously to the right hand end of cylinder 123 by means of a conduit 349 (Fig. 10) which connects at one end with the low side of the high pressure relief valve 326 and also connects by means of a branch conduit 350 with groove 314 of valve 310.

In the invention in the form just described, the stem 276 of the speed selector valve 275 may be operated manually by means of a suitable handle (not shown). When the invention is used in connection with a machine tool, however, means is preferably provided for operating the valve 275 automatically in accordance with the functioning of the machine. As illustrated in Fig. 10, the valve stem 276 has a beveled gear 360 thereon meshing with a second beveled gear 361 secured to a shaft 362. Intermeshing bevel gears 363 and 364 connect shaft 362 with a shaft 365, one end of which is secured to a tool turret 366 of the type generally provided in machines such as turret lathes. The tool turret of such a machine is generally indexed automatically during the operation of the machine, the connections just described providing for the indexing of the valve 275 simultaneously with the indexing of the tool turret. In this way, a different speed of operation of a machine part (driven from the output shaft 28) may be obtained for each tool on the turret. Although not illustrated herein, such machine part may be the work supporting spindle.

In operating the form of the invention illustrated in Figs. 1 to 10, it is contemplated that the electric driving motor 24 will operate at a constant speed and drive the pump shaft 32. The casing 20 and more particularly the reservoir 300 therein is filled with fluid, preferably up to the level indicated in Fig. 2. The casing may be provided with a tubular air passage 370 (Figs. 1 and 4) extending through the reservoir for oil cooling purposes. With a speed change mechanism 26 as illustrated in Figs. 1 to 3 and 5, a handle 375 thereon is moved to one of its two operative positions to condition the speed change mechanism in accordance with the desires of the operator. As shown in Figs. 3 to 5 and 10, the speed change mechanism is in direct drive and the handle 375 is in the direct drive position. The handle 170 of the reversing valve 160 is in its stop position with the result that the wobble plate 39 is in its zero stroke position and the wobble plate 99 is at maximum stroke. Under these circumstances, make-up fluid is supplied by the pump 87 but there is no discharge of fluid by the pump 30, excess make-up fluid being returned to the reservoir 300 over the low pressure relief valve 305. In order to provide for operation of the pistons 63 and 155, however, make-up fluid may pass from the conduit 304'', through conduit 348, check valve 346, conduit 347, annular groove 315, conduits 325 and 327, and ports 163 and 164 to the reversing valve 160, so that movement of the reversing valve handle 170, for example, to the forward position permits fluid to flow to the cylinder 154 to move the piston 155 (Fig. 4) toward the right. The movement of the piston under these conditions will be determined by the control mechanism 27 and, more particularly, by the portion of the control mechanism then effective as determined by the valve 275. With the valve 275 positioned as shown in Figs. 7 and 10, the movement of the piston 155 (Fig. 4) will be stopped when the flange 250 (Fig. 7) engages the abutment 248. The screw 240 shown in Figs. 7 and 10 is adjusted to a "stop" position, hence there will be no movement and no tilting of the wobble plate 39. High pressure control conduit 328 leading to the control mechanism 27 is initially supplied with fluid from the make-up pump through the conduit 327. Upon adjustment of the wobble plate 39 so as to effect operation of the pump 30, however, fluid under high pressure is supplied to the control conduits 327 and 328 and thereby to the reversing valve 160 and the control mechanism 27.

With the reversing valve 160 in its forward position, the valve 312 (Figs. 6 and 10) takes the position illustrated therein due to the action of the high pressure fluid acting on the lower (Fig. 10) end of the valve. The high pressure fluid is supplied through the conduit 317 from port 81, port 81 then serving as a supply port from the pump 30 to the motor 31, and ports 85 serving as return ports. Assuming that the screw 240 of Figs. 7 and 10 is turned down or the valve 275 is turned to render another screw effective, shift of piston 155 and control element 238 will take place causing tilting of the pump wobbler plate device 39, rendering the pump effective to supply high pressure fluid and rotate the driven shaft in a forward direction The transmission will then continue to operate the output shaft 28 in a forward direction. The speed of the output shaft may thereafter be changed either by indexing the valve 275 to one of its other operative positions or by shifting the valve 331 to its low speed position. The output shaft may be stopped or reversed by means of the valve 160. The output shaft may be stopped also by turning valve 275 to the position of Figs. 7 and 10 where the effective screw 240 provides for "stop." To change the speed of the output shaft by means of the valve 275, it is merely necessary to move this valve to any one of its other positions. It is not necessary that the valve be moved to an adjacent position. Movement of valve 275 to another position causes the corresponding piston 246 to be moved upwardly (Figs. 7 and 10) into engagement with the corresponding screw device 240. At the same time the piston 246 which had previously been held in its upper position by pressure fluid, is released. The newly selected piston 246 then determines the speed of the motor shaft 92. If a newly selected speed is faster than the speed previously obtained, the plunger 238 is moved downwardly to its new position chiefly by the high fluid pressure in cylinder 154. If the new motor speed is lower than the previously selected speed, the plunger 238 is moved upwardly from the position shown in Fig. 7 by the action of the newly selected piston 246. Operation of valve 275 results, through the intervening gearing, in a movement of the piston 122 (Fig. 4) by the pinion 231, thus causing an adjustment of the wobble plate 99 by means including the lever 120, and an adjustment of the wobble plate 39 by means including the lever 60.

The rotation of the motor shaft 92 may be reversed by moving the valve 160 to the reverse position. This would require movement of the handle 170 (Fig. 3) in a counterclockwise direction from the position indicated. This movement of the valve 160 causes fluid under high pressure to flow into the cylinder 64 whereupon the piston 63 moves toward the right (Figs. 4 and 10) and shifts the wobble plate 39 in a direction opposite to that caused by the piston 155. This reversal of the wobble plate 39 causes a change in the direction of the fluid through the pump so that the ports 83, 85, 86 conduct fluid under high pressure from the pump to the motor, and passage 81 serves as a return port. This change in the direction of fluid flow also causes a shift of the valve 312 to its lowermost position (Figs. 6 and 10) since the conduit 316 which communicates at one end with the port 85 and at the other end with the upper portion of the valve bore 311, subjects the upper end of the valve 312 to high pressure fluid. The lower end of the valve bore 311 is then connected to the return passage 81 by the conduit 317, so as to deliver make-up fluid thereto. Unless the valve 275 is actuated simultaneously with the actuation of the reversing valve, the speed of the motor shaft 92 in the reverse direction will be the same as the speed previously obtained in a forward direction.

In Fig. 11, there is illustrated a modified form of the means for adjusting the strokes of the pump 30 and motor 31, more particularly a means for accomplishing the adjustment of these strokes manually. As illustrated in said figure, a piston 122' is located in a cylinder 123" and has a projecting stem 371 which projects through a centrally apertured closure 372 for the right hand end of the cylinder 123'. A pair of laterally spaced arms 373 project outwardly from the closure 372 and carry a pivot pin 374 on which an arcuate motion transmitting and direction changing dog 375 is swingably mounted. This dog has one end portion 376 engaging the horizontal stem 371, and another end portion 377 engaging a vertically adjustable stop 378. The stop 378 has a stem 379 extending into a bore 380 in a vertical adjusting screw 381, the lower end of which is threaded into a bushing 382 secured to a detachable cover 22' of the casing 20. A hand knob 383 is secured to the upper end of the screw 381 by means of a pin 384, so that the stop 378 may be raised and lowered by rotating the screw 381.

The stop 378 is effective to determine the limit of the movement of the piston 122' toward the right (Fig. 11) by action of the pistons 63 and 155. As shown, the stop 378 is in a zero speed or "stop" position.

The operation of this form of the invention is generally the same as that of the form shown in Figs. 1 to 10 so far as the reversing valve 160 is concerned. The speed of the motor is determined by the setting of the stop 378. In order to facilitate adjustment of the speed during operation, the stop 378 is preferably rotatably mounted in the bushing 388, and a ball bearing 379' is inserted between the upper end of the stem 379 and the end of the socket in the bushing 288, in which said stem is located.

In the form illustrated in Fig. 12, the speed control is automatic and of the same construction as that illustrated in Figs. 1 to 10. Included, however, is a means for retarding the shifting of the wobble plate devices at low speeds so as to retard the acceleration of the output shaft. Referring to Fig. 12, a control piston 122" is reciprocable in a cylinder 123" which is extended toward the right and has a supplemental piston 386 therein. The piston 122" has an integral extension 389 of reduced diameter, the end of which is attached to the piston 386. The right hand end of the cylinder 123" is supplied with fluid from the low side of the high pressure relief valve 326 through a port 393, a check valve 394, and a port 395 in the closure 388. At low output shaft speeds, the movement of the piston 122" toward the right (Fig. 12) is retarded by means of a restricted outlet orifice 390, the flow through which may be adjusted by means of a valve device 391 which has an operating stem 392 projecting up through the casing cover 22". When the pistons move to the right, the check valve 394 is closed. The supplemental piston 386 has a plurality of longitudinal ports 396 therethrough for conducting fluid to the left hand side of said piston and into the portion of the cylinder 123" occupied by the reduced portion 389 of the piston 122". The check valve 394 permits fluid to flow into the cylinder 123" but prevents return flow, with the result that the fluid, at low speeds of the output shaft, must flow out through the restricted orifice 390.

At higher output shaft speeds, the supplemental piston is positioned farther to the right in cylinder 123" than shown in Fig. 12. When the output shaft speeds reach a predetermined high value, the delayed acceleration may not be essential. Accordingly, a supplemental port 397 is provided for exhausting fluid from the cylinder 123". This port serves as a bypass around the restricted orifice 390 when the speed of the motor is higher and the supplemental piston 386 has moved toward the right sufficiently to uncover the port 397.

The operation of the form of invention illustrated in Fig. 12 is similar to that of the form shown in Figs. 1 to 10 with the exception that the reversal of the motor is retarded at low speeds. In the speed range wherein the restricted orifice 390 is effective, the speed of reversal may be adjusted by means of the valve device 391.

I claim as my invention:

1. A fluid transmission having, in combination, a reversible flow pump, a variable speed reversible motor connected to receive the fluid output of said pump, means including a pump control member for reversing the output of said pump, means including a motor control member for varying the speed of said motor, fluid operated mechanism associated with said pump and motor control members operable to adjust the motor speed with either direction of fluid flow and means for obtaining any one of a plurality of pre-selected motor speeds comprising adjustable stop devices having parts movable from effective to ineffective positions with respect to said mechanism, said movable parts being fluid operated, and means operable selectively to direct fluid to one of said stop devices.

2. In a control mechanism for adjustable speed fluid motors, in combination, a plurality of adjustable stops, a shiftable control element, movably mounted members associated with said stops and control element operable selectively to determine the position of said control element in accordance with the position of an associated stop, a motor speed control device, and fluid operated means for positioning said device in accordance with the position of the control element.

3. In a fluid transmission having a reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of piston and cylinder devices, racks on the pistons thereof, a pinion interconnecting said racks, means connecting said pump control element to the piston of one of said devices, means for admitting fluid under pressure to the head ends of said cylinders alternatively to move the pump control element to forward or reverse position, and movably mounted means connected to said motor control element shiftable by the tail end of the piston to which fluid is admitted.

4. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position, movably mounted means connected to said motor control element shiftable by the tail end of the piston to which fluid is admitted, means determining the position to which said selected piston moves said control elements comprising a plurality of adjustable stop devices having parts movable from effective to ineffective positions with respect to said motor element, and means operable to select and effect the movement of said parts individually.

5. A fluid transmission having, in combination, a reversible flow pump, a variable speed motor connected to receive the fluid output of said pump, means for reversing the output of said pump, means including a motor control member for varying the speed of said motor, fluid operated means for shifting said motor control member in a direction to increase the motor speed with either direction of fluid flow from said pump, and means for obtaining any one of a plurality of pre-selected motor speeds by adjustments including varying the position of said motor control member comprising a reciprocably mounted plunger associated with said motor control member and having an annular flange thereon, a plurality of cylinders arranged annularly about said plunger adjacent said flange, pistons in said cylinders having side wall notches into which said flange projects, an adjustable stop device for each piston for determining its extent of movement in one direction, and means for selecting and effecting the movement of said pistons into engagement with said stop devices one at a time, the selected piston acting on the plunger in opposition to and overcoming the action of said fluid operated means thereon so that the engagement of the flange on the plunger with one end of the notch in the selected position when abutting its stop determines the speed of the motor.

6. A fluid transmission having, in combination, a variable speed motor, means to supply fluid under pressure to said motor, means including a motor control member for varying the speed of said motor, pressure fluid operated means for urging said motor control member in a direction to increase the motor speed, and means for obtaining any one of a plurality of pre-selected motor speeds comprising a reciprocably mounted plunger associated with said motor control member and having an annular flange thereon, a plurality of cylinders arranged annularly about said plunger adjacent said flange, pistons in said cylinders each operable to engage the flange and act on said plunger in opposition to and overcoming the action of said fluid operated means thereon, an adjustable stop device for each piston for determining the actuated position thereof, and means for selecting and effecting the movement of said pistons one at a time by pressure fluid into engagement with said plunger and stop devices.

7. A fluid transmission having, in combination, a pump, a variable speed motor connected to receive the fluid output of said pump, means for reversing the output of said pump, means including a motor control member for varying the speed of said motor, fluid operated means urging said motor control member in a direction to increase the motor speed with either direction of fluid flow from said pump, and means for obtaining any one of a plurality of pre-selected motor speeds comprising a reciprocably mounted element associated with said motor control member and having a plurality of cylinders arranged annularly about said element, pistons in said cylinders arranged to engage and act on said element in opposition to and overcoming the action of said fluid operated means thereon when moved in a speed determining direction, an adjustable stop device for each piston for determining its extent of movement in such speed determining direction, and means for selecting and effecting the movement of said pistons into engagement with said stop devices one at a time.

8. In a fluid transmission having a reversible flow pump and a variable displacement motor, a pump control element having forward and reverse positions, a motor displacement control element movable from maximum to minimum motor displacement, means for adjusting the pump displacement control element comprising forward and reverse piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position, movably mounted means connected to said motor control element shiftable by the tail end of the piston to which fluid is admitted, and means for determining the position to which said selected piston moves said control elements comprising a reciprocably mounted device connected to said motor control element, a plurality of cylinders, speed selecting pistons in said cylinders arranged to act on said device in opposition to and overcoming the action of said forward and reverse pistons thereon, an independently adjustable stop device for each of said speed selecting pistons for determining the extent of movement of said piston in a speed determining direction, and means for selecting and effecting the movement of said pistons into engagement with said stop devices one at a time.

9. The combination of a variable speed motor, means for adjusting the speed thereof comprising a speed control element movable to any one of a plurality of positions, means for determining said positions comprising adjustable devices associated with said control element and effective selectively to determine the position of the control element and an adjustable dashpot device operable to delay the shifting of said control element from one position to another in the lower range of motor speeds, said dashpot having a bypass port rendering the dashpot ineffective in the higher range of motor speeds.

10. In a fluid transmission having a reversible flow pump and a variable speed motor, a pump control element having forward, stop, and reverse positions, a motor speed control element movable from maximum to minimum motor speed, means for adjusting the pump control element comprising a pair of piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively, or not at all, to move the pump control element to forward or reverse, or stop position, a movably mounted member connected to said motor control element shiftable by the tail end of the piston to which fluid is admitted, manually adjustable means determining the position to which said selected piston moves said member, a dashpot piston and cylinder device having one element thereof secured to said member and the other held stationary, means supplying fluid under pressure to said dashpot cylinder to return the pump control element to its stop position, and a valve controlled port in said dashpot cylinder for delaying the discharge of fluid therefrom.

11. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position, and a reciprocably mounted plunger connected to said motor control element and disposed to be abutted and shifted by the tail end of either of the pistons of said pair of piston and cylinder devices.

12. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a plunger connected to said motor control element and disposed to be abutted and shifted longitudinally by the tail end of either of the pistons of said pair of piston and cylinder devices, and fluid pressure means urging said plunger in a direction to restore the pistons of said pair of devices to a neutral position of the pump control element when the fluid is relieved from the head ends of said cylinders.

13. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a plunger and cylinder device with the plunger connected to said motor control element, said plunger being disposed to be abutted and shifted longitudinally by the tail end of either of the pistons of said pair of piston and cylinder devices, and means supplying fluid under pressure to the end of the cylinder of said plunger and cylinder device constantly urging said plunger in a direction to restore the pistons of said pair of devices to a neutral position of the pump control element when the fluid is relieved from the head ends of said cylinders.

14. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to head ends of said cylinders alternatively to move the pump control element to forward or reverse position, or for relieving fluid from said cylinders, a plunger connected to said motor control element and disposed to be abutted and shifted longitudinally by the tail end of either of the pistons of said pair of piston and cylinder devices, fluid pressure means constantly urging said plunger in a direction to restore the pistons of said pair of devices to a neutral position of the pump control element when the fluid is relieved from the head ends of said cylinders, and manually adjustable means acting through said plunger to determine the position to which said selected piston moves said control elements.

15. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a plunger and cylinder device with the plunger connected to said motor control element, said plunger being disposed to be abutted and shifted longitudinally by the tail end of either of the pistons of said pair of piston and cylinder devices, means supplying fluid under pressure to the end of the cylinder of said plunger and cylinder device constantly urging said plunger in a direction to restore the pistons of said pair of devices to a neutral position of the pump control element when the fluid is relieved from the head ends of said cylinders, manually adjustable fluid actuated means acting through said plunger to determine the position to which said selected piston moves said control elements, a source of pressure fluid for said last mentioned means different from the source for said plunger and cylinder device, and means for controlling the supply of fluid to said manually adjustable means.

16. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a first fluid actuated device urging the pistons of said pair of devices toward neutral position, a second fluid actuated device interconnected with said first fluid actuated device and also operative to urge the pistons of said pair of devices toward neutral position, said first and said second fluid actuated devices being effective to restore said pair of devices to neutral position upon relief of fluid from said pair of devices, and means interconnecting said motor control element and one of said first or second fluid actuated devices.

17. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a first fluid actuated device urging the pistons of said pair of devices toward neutral position, a second fluid actuated device interconnected with said first fluid actuated device and also operative to urge the pistons of said pair of devices toward neutral position, said first and said second fluid actuated devices being effective to restore said pair of devices to neutral position upon relief of fluid from said pair of devices, means interconnecting said motor control element and one of said first or second fluid actuated devices, and manually adjustable means acting on one of said first or second fluid actuated devices to determine the position to which said selected piston moves said control elements.

18. In a fluid transmission having a variable displacement reversible flow pump and a variable displacement motor, a pump displacement control element having forward and reverse positions on opposite sides of a neutral position, a motor displacement control element movable from maximum to minimum motor displacement, means for adjusting the pump displacement control element comprising a pair of parallel piston and cylinder devices, means interconnecting the pistons thereof for simultaneous operation in opposite directions, means connecting said pump control element to the piston of one of said devices, said last mentioned means operating to move said pump control element to forward or reverse position with movement of said one piston in one or the opposite direction from a neutral position, means for admitting fluid under pressure to the head ends of said cylinders alternatively to move the pump control element to forward or reverse position or for relieving fluid from said cylinders, a first fluid actuated device urging the pistons of said pair of devices toward neutral position, a second fluid actuated device interconnected with said first fluid actuated device and also operative to urge the pistons of said pair of devices toward neutral position, said first and said second fluid actuated devices being effective to restore said pair of devices to neutral position upon relief of fluid from said pair of devices, means interconnecting said motor control element and one of said first or second fluid actuated devices, manually adjustable means acting on one of said first or second fluid actuated devices to determine the position to which said selected piston moves said control elements, a source of pressure fluid for one of said neutralizing devices, and a different source of pressure fluid for the other of said neutralizing devices, said manually adjustable means and said pair of piston and cylinder devices.

GUNNAR A. WAHLMARK.